(12) United States Patent
Bennett et al.

(10) Patent No.: US 8,408,965 B2
(45) Date of Patent: Apr. 2, 2013

(54) EDDY CURRENT GAIN COMPENSATION

(75) Inventors: Doyle E. Bennett, Santa Clara, CA (US); Thomas H. Osterheld, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 805 days.

(21) Appl. No.: 12/577,663

(22) Filed: Oct. 12, 2009

(65) Prior Publication Data

US 2010/0099334 A1 Apr. 22, 2010

Related U.S. Application Data

(60) Provisional application No. 61/106,127, filed on Oct. 16, 2008.

(51) Int. Cl.
*B24B 49/00* (2012.01)
*B24B 51/00* (2006.01)

(52) U.S. Cl. .......... 451/5; 340/680; 451/9; 451/10; 451/11; 451/21; 451/41; 451/56

(58) Field of Classification Search .......... 340/680; 451/5, 8, 9, 10, 11, 21, 41, 56, 287
See application file for complete search history.

(56) References Cited

U.S. PATENT DOCUMENTS

| | | |
|---|---|---|
| 4,005,359 A | 1/1977 | Smoot |
| 4,112,365 A | 9/1978 | Larson et al. |
| 4,303,885 A | 12/1981 | Davis et al. |
| 4,467,281 A | 8/1984 | Davis et al. |
| 4,556,845 A | 12/1985 | Strope et al. |
| 4,715,007 A | 12/1987 | Fujita et al. |
| 4,716,366 A | 12/1987 | Hosoe et al. |
| 4,829,251 A | 5/1989 | Fischer |
| 4,849,694 A | 7/1989 | Coates |
| 5,003,262 A | 3/1991 | Egner et al. |
| 5,096,754 A | 3/1992 | Hammer et al. |
| 5,213,655 A | 5/1993 | Leach et al. |
| 5,237,271 A | 8/1993 | Hedengren |
| 5,343,146 A | 8/1994 | Koch et al. |

(Continued)

FOREIGN PATENT DOCUMENTS

| | | |
|---|---|---|
| EP | 0 460 348 | 12/1991 |
| EP | 1 116 552 | 7/2001 |

OTHER PUBLICATIONS

Applied Materials, Inc., International Search Report and the Written Opinion of the PCT Application No. PCT/US2009/060397 mailed May 1, 2010, 11 pages.

*Primary Examiner* — Timothy V Eley

(74) *Attorney, Agent, or Firm* — Fish & Richardson P.C.

(57) ABSTRACT

In-situ monitoring during processing of a substrate includes processing a conductive film on a substrate in a semiconductor processing apparatus and generating a signal from an eddy current sensor during processing. The signal includes a first portion generated when the eddy current sensor is adjacent the substrate, a second portion generated when the eddy current sensor is adjacent a metal body and not adjacent the substrate, and a third portion generated when the eddy current sensor is adjacent neither the metal body nor the substrate. The second portion of the signal is compared to the third portion of the signal and a gain is determined based at least on a result of the comparing, and the first portion of the signal is multiplied by the gain to generate an adjusted signal.

17 Claims, 6 Drawing Sheets

U.S. PATENT DOCUMENTS

| | | | |
|---|---|---|---|
| 5,355,083 A | 10/1994 | George et al. | |
| 5,433,651 A | 7/1995 | Lustig | |
| 5,525,903 A | 6/1996 | Mandl et al. | |
| 5,541,510 A | 7/1996 | Danielson | |
| 5,559,428 A | 9/1996 | Li et al. | |
| 5,644,221 A | 7/1997 | Li et al. | |
| 5,660,672 A | 8/1997 | Li et al. | |
| RE35,703 E | 12/1997 | Koch et al. | |
| 5,731,697 A | 3/1998 | Li et al. | |
| 5,893,796 A | 4/1999 | Birang et al. | |
| 6,068,539 A | 5/2000 | Bajaj et al. | |
| 6,086,734 A | 7/2000 | Harada | |
| 6,254,459 B1 | 7/2001 | Bajaj et al. | |
| 6,549,006 B2 | 4/2003 | Le | |
| 6,563,308 B2 | 5/2003 | Nagano et al. | |
| 6,741,076 B2 | 5/2004 | Le | |
| 6,762,604 B2 | 7/2004 | Le | |
| 6,808,590 B1 | 10/2004 | Gotkis | |
| 6,945,845 B2 | 9/2005 | Bennett et al. | |
| 6,951,503 B1 * | 10/2005 | Gotkis et al. | 451/9 |
| 7,016,795 B2 | 3/2006 | Swedek et al. | |
| 7,205,166 B2 * | 4/2007 | Gotkis et al. | 438/14 |
| 2001/0008827 A1 | 7/2001 | Kimura et al. | |
| 2002/0053904 A1 | 5/2002 | Chen et al. | |
| 2002/0077031 A1 | 6/2002 | Johansson et al. | |
| 2002/0164925 A1 | 11/2002 | Swedek et al. | |
| 2003/0067298 A1 | 4/2003 | Nagano et al. | |
| 2003/0206008 A1 | 11/2003 | Le | |
| 2003/0206009 A1 | 11/2003 | Le | |
| 2003/0210041 A1 | 11/2003 | Le | |
| 2004/0152310 A1 | 8/2004 | Swedek et al. | |
| 2004/0176014 A1 * | 9/2004 | Bennett et al. | 451/5 |
| 2004/0259470 A1 | 12/2004 | Swedek et al. | |
| 2005/0017712 A1 | 1/2005 | Le | |
| 2005/0072528 A1 | 4/2005 | Owcarz et al. | |
| 2005/0194971 A1 | 9/2005 | Lehman et al. | |
| 2006/0009132 A1 * | 1/2006 | Bennett et al. | 451/8 |
| 2007/0251922 A1 | 11/2007 | Swedek et al. | |

* cited by examiner

EDDY CURRENT GAIN COMPENSATION

CROSS-REFERENCE TO RELATED APPLICATIONS

This application claims priority to U.S. Provisional Application Ser. No. 61/106,127, filed Oct. 16, 2008, which is incorporated herein by reference.

TECHNICAL FIELD

This disclosure relates to endpoint detection in semiconductor manufacturing.

BACKGROUND

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier head. The exposed surface of the substrate is placed against a rotating polishing pad. The carrier head provides a controllable load on the substrate to push it against the polishing pad. A polishing liquid, such as a slurry with abrasive particles, is supplied to the surface of the polishing pad.

One problem in CMP is determining whether the polishing process is complete, i.e., whether a substrate layer has been planarized to a desired flatness or thickness, or when a desired amount of material has been removed. Overpolishing (removing too much) of a conductive layer or film may lead to increased circuit resistance. On the other hand, underpolishing (removing too little) of a conductive layer may lead to electrical shorting. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the desired thickness and polishing endpoint. Therefore, the polishing endpoint cannot be determined merely as a function of polishing time.

SUMMARY

In one aspect, a method of in-situ monitoring during processing of a substrate includes processing a conductive film on a substrate in a semiconductor processing apparatus and generating a signal from an eddy current sensor during processing. The signal includes a first portion generated when the eddy current sensor is adjacent the substrate, a second portion generated when the eddy current sensor is adjacent a metal body and not adjacent the substrate, and a third portion generated when the eddy current sensor is adjacent neither the metal body nor the substrate. The second portion of the signal is compared to the third portion of the signal and a gain is determined based at least on a result of the comparing, and the first portion of the signal is multiplied by the gain to generate an adjusted signal.

Implementations can include one or more of the following features. A plurality of sweeps may be made with the eddy current sensor across the substrate and the metal body to generate a plurality of signals, each of the plurality of signals may include the first portion, second portion and third portion. The comparing and multiplying may be performed at each sweep of the plurality of sweeps to generate a plurality of adjusted signals. The substrate processing apparatus may include a chemical mechanical polisher that includes a polishing pad situated on a rotatable platen, the eddy current sensor may be situated in the platen and may sweep the substrate once per rotation of the platen. The metal body may be on the polishing pad. The substrate may be held on the polishing pad with a carrier head having a retaining ring, and the metal body may be a portion of the retaining ring. The metal body may be a portion of a conditioning disk for conditioning the polishing pad. A first reference value may be generated from the second portion of the signal and a second reference value may be generated from the third portion of the signal. A first constant that represents a target value for the signal from the eddy current sensor when the eddy current is off-wafer or when the substrate is a bare substrate and a second constant that represents a target value for the signal from the eddy current sensor when the conductive film has a thickness equivalent to the metal body may be stored. The gain may be $(K_1-K_2)/(S_1-S_2)$ where $K_1$ is the first constant, $K_2$ is the second constant, $S_1$ is the first reference value, and $S_2$ is the second reference value. The signal may be a phase difference signal.

In another aspect, a computer program product, tangibly encoded on a computer readable media, is operable to cause a data processing apparatus to perform these operations.

Potential advantages of implementations can include one or more of the following. Gain can be adjusted automatically to compensate for changes in environmental conditions or thickness of the polishing pad that effect the eddy current signal.

DETAILED DESCRIPTION

For some eddy current sensors, the sensor signal S is a linear function of the thickness T of the metal outer layer, e.g., S=b−mT, where b is an offset and m is a gain of the eddy current sensor. In particular, a phase difference between an AC drive signal and a sensed signal can be correlated, e.g., as a substantially linear function, to the thickness of the polished layer. However, gain can vary sensor-to-sensor due to differences between sensors, such as the way in which the coils are wound on the sensor core, slight differences in core dimensions, and batch-to-batch variations in core materials. Environmental conditions, such as a change in temperature of the sensor, may also have an impact on the eddy current sensor gain. In addition, as a polishing pad is worn, the thickness of the pad decreases, and the distance between the substrate and the coil decreases, generally resulting in an increase in gain. As a result, gain of the eddy current sensor can vary from wafer-to-wafer. As described below, the gain of an in-situ eddy current sensor or other in-situ sensor can calibrated to so that signal drift may be reduced or eliminated.

Figure 1:
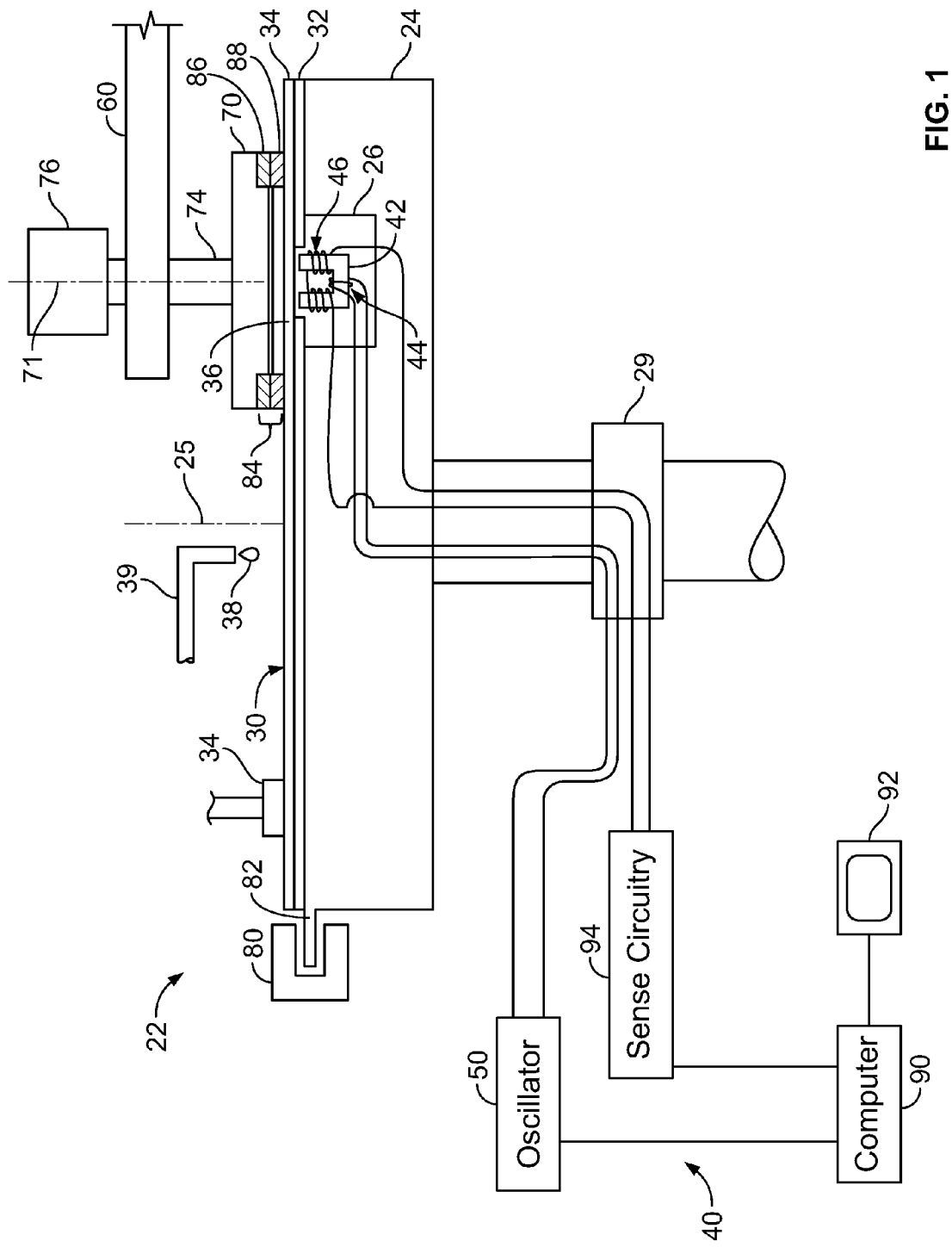
FIG. 1 is a schematic side view, partially cross-sectional, of an embodiment of a chemical mechanical polishing apparatus including an eddy current monitoring system.

Referring to FIG. 1, an eddy current monitoring system 40 is provided in a polishing station 22 of chemical mechanical polishing apparatus. The CMP apparatus can include additional polishing stations and a transfer station.

The polishing station 22 includes a rotatable platen 24 on which is placed a polishing pad 30. Each polishing station can also include a pad conditioner apparatus with a conditioning disk 34 to maintain the condition of the polishing pad. A slurry 38 can be supplied to the surface of polishing pad 30 by a slurry supply port or combined slurry/rinse arm 39.

A carrier head 70 is supported by a rotatable carousel 60 and is connected by a carrier drive shaft 74 to a carrier head rotation motor 76 (shown by the removal of one quarter of cover 68) so that each carrier head can independently rotate about it own axis 71. In addition, each carrier head 70 independently laterally oscillates. In operation, the platen is rotated about its central axis 25, and the carrier head is rotated about its central axis 71 and translated laterally across the surface of the polishing pad.

The carrier head 70 includes a retaining ring 84 to hold the substrate. In some implementations, the retaining ring 84 includes a highly conductive portion, e.g., the carrier ring can include a thin lower plastic portion 86 that contacts the polishing pad, and a thick upper conductive portion 88. In some implementations, the highly conductive portion is a metal, e.g., the same metal as the layer being polished, e.g., copper.

A recess 26 is formed in platen 24, and a thin section 36 can be formed in polishing pad 30 overlying recess 26. Aperture 26 and thin pad section 36, if needed, are positioned such that they pass beneath substrate 10 during a portion of the platen rotation, regardless of the translational position of the carrier head.

The in-situ eddy current monitoring system 40 measures the thickness of the metal layer undergoing polishing and/or functions as an endpoint detector. A similar eddy current monitoring system is described in U.S. Pat. Nos. 7,016,795 and 7,024,269, the entire disclosures of which are incorporated herein by reference.

Figure 2:
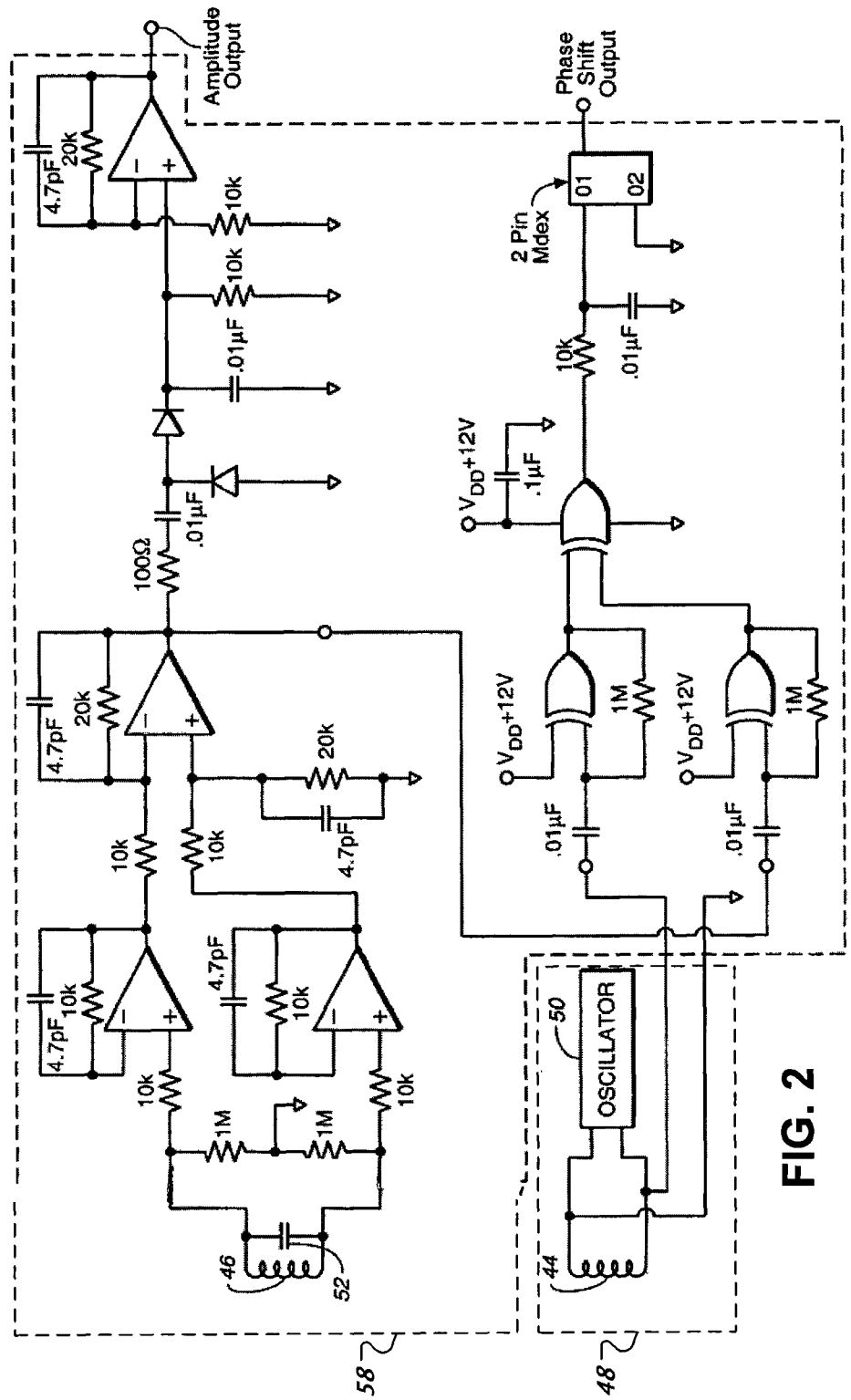
FIG. 2 is a schematic circuit diagram of one implementation of the eddy current monitoring system.

Referring to FIGS. 1 and 2, the in-situ eddy current monitoring system 40 includes a drive system 48 to induce eddy currents in a metal layer on the substrate and a sensing system 58 to detect eddy currents induced in the metal layer by the drive system. The monitoring system 40 includes a core 42 positioned in recess 26 to rotate with the platen, and at least one coil 44 wound around one part of core 42. In some implementations, a single coil can be used, whereas in other implementations both a drive coil and a separate sense coil are wound around the core.

In some implementations, the drive system 48 includes an oscillator 50 connected to drive coil 44 wound around the core 42, and the sensing system 58 includes a sense coil 46 wound around the core 42 and other sensing circuitry 94. Components of the eddy current monitoring system other than the coils and core, e.g., the oscillator 50 and other circuitry, can be located apart from platen 24, and can be coupled to the components in the platen through a rotary electrical union 29, or can be installed in the platen and communicate with a controller outside the platen through the rotary electrical union 29.

Figure 3:
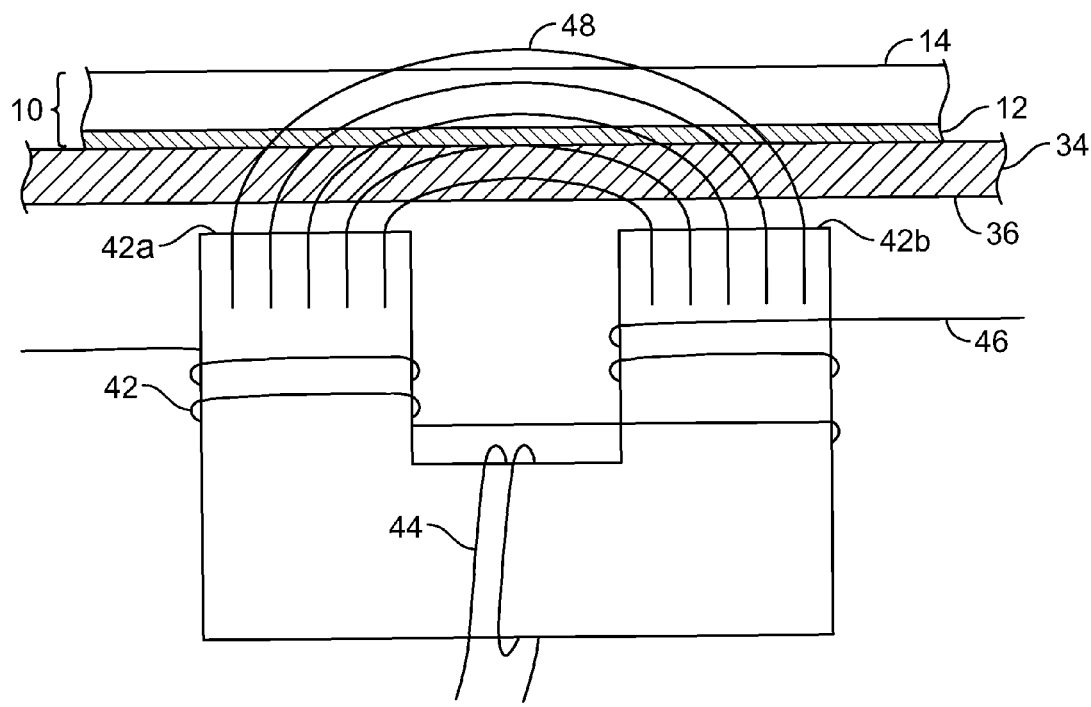
FIG. 3 is a schematic cross-sectional view illustrating a magnetic field generated by the monitoring system.

Referring to FIG. 3, in operation the oscillator 50 drives drive coil 44 to generate an oscillating magnetic field 48 that extends through the body of core 42 and into the gap 46 between the two poles 42a and 42b of the core. At least a portion of magnetic field 48 extends through thin portion 36 of polishing pad 30 and into substrate 10. If a conductive layer, e.g., a metal layer, is present on substrate 10, oscillating magnetic field 48 generates eddy currents in the metal layer. The eddy currents cause the metal layer to act as an impedance source, affecting current flowing through sense coil 46. As the thickness of the metal layer changes, the impedance changes, resulting in a change in the Q-factor of the sensing mechanism. By detecting the change in the Q-factor of the sensing mechanism, the eddy current sensor can sense the change in the strength of the eddy currents, and thus the change in thickness of metal layer.

In some implementations, the eddy current monitoring system outputs a signal that is proportional to the amplitude of the current flowing in the sense coil 46. In some implementations, the eddy current monitoring system outputs a signal that is proportional to the phase difference between the drive signal from the oscillator 50 and the current flowing in the sense coil 46. Other implementations are possible.

Returning to FIG. 2, some implementations of the circuitry of the eddy current monitoring system output both an amplitude signal and a phase difference signal. In this implementation, the drive and sense signals are combined to generate a phase shift signal with a pulse width or duty cycle which is proportional to the phase difference. In this implementation, two XOR gates 100 and 102 are used to convert sinusoidal signals from the sense coil 46 and oscillator 50, respectively, into square-wave signals. The two square-wave signals are fed into the inputs of a third XOR gate 104. The output of the third XOR gate 104 is a phase shift signal with a pulse width or duty cycle proportional to the phase difference between the two square wave signals. The phase shift signal is filtered by an RC filter 106 to generate a DC-like signal with a voltage proportional to the phase difference. Alternatively, the signals can be fed into a programmable digital logic, e.g., a Complex Programmable Logic Device (CPLD) or Field Programmable Gate Array (FGPA) that performs the phase shift measurements.

Figure 4:
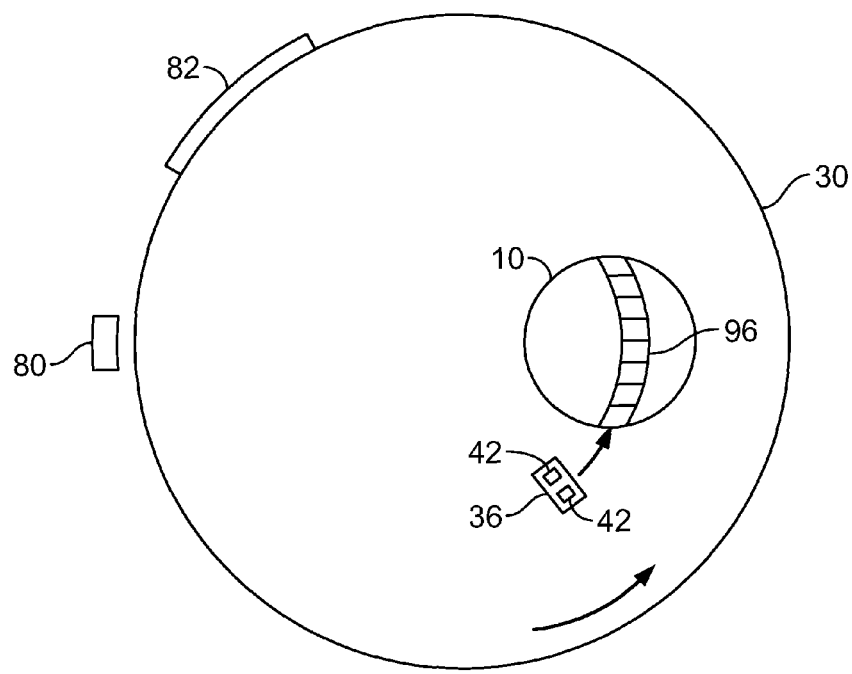
FIG. 4 is a schematic top view of a chemical mechanical polishing apparatus including an eddy current monitoring system, showing a path of a sensor scan across a wafer.

Referring to FIG. 4, the CMP apparatus can also include a position sensor 80, such as an optical interrupter, to sense when core 42 is beneath substrate 10. For example, the optical interrupter could be mounted at a fixed point opposite carrier head 70. A flag 82 is attached to the periphery of the platen. The point of attachment and length of flag 82 is selected so that it interrupts the optical signal of sensor 80 while core 42 sweeps beneath substrate 10. Alternately, the CMP apparatus can include an encoder to determine the angular position of platen The core 42, drive coil 44 and sense coil 46 of the eddy current sensor located below thin section 36 of polishing pad 32 can sweep beneath the substrate with each rotation of the platen.

In operation, CMP apparatus uses monitoring system 40 to determine when the bulk of the filler layer has been removed and/or the underlying stop layer has been exposed. Monitoring system 40 can as be used to determine the amount of material removed from the surface of the substrate. Returning to FIG. 1, a general purpose programmable digital computer 90 can be connected to sensing circuitry 94 to receive the intensity and phase difference signals. Computer 90 can be programmed to sample measurements from the monitoring system when the substrate generally overlies the core, to store the measurements, and to apply the endpoint detection logic to the measured signals to detect the polishing endpoint. Possible endpoint criteria for the detector logic include local minima or maxima, changes in slope, threshold values in amplitude or slope, or combinations thereof. In addition, computer 90 can also be programmed to divide the amplitude measurements from each sweep of the core beneath the substrate into a plurality of sampling zones 96, to calculate the radial position of each sampling zone, to sort the amplitude measurements into radial ranges, to determine minimum, maximum and average amplitude measurements for each sampling zone, and to use multiple radial ranges to determine the polishing endpoint.

Since the eddy current sensor sweeps beneath the substrate with each rotation of the platen, information on the metal layer thickness is being accumulated in-situ and on a continuous real-time basis. In fact, the measurements from the eddy current sensor can be displayed on an output device 92 during polishing to permit the operator of the device to visually monitor the progress of the polishing operation. Moreover, after sorting the measurements into radial ranges, information on the metal film thickness can be fed in real-time into a closed-loop controller to periodically or continuously modify the polishing pressure profile applied by a carrier head.

Figure 5A:
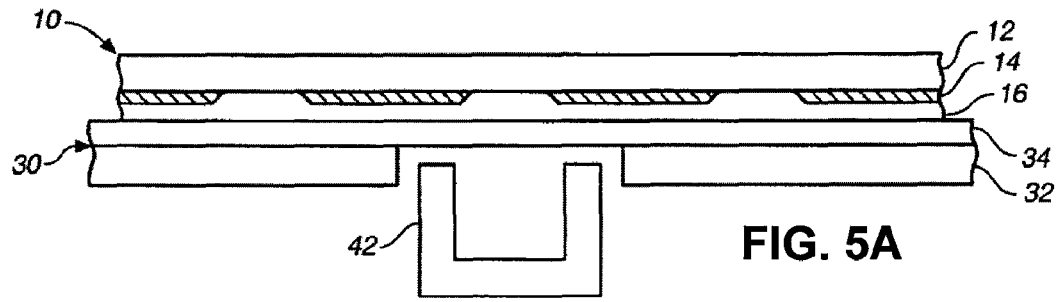
FIGS. 5A-5C schematically illustrating a method of detecting a polishing endpoint using an eddy current sensor.

As shown in FIGS. 5A, for a polishing operation, a substrate 10 is placed in contact with polishing pad 30. Substrate 10 can include a silicon wafer 12 and a conductive layer 16, e.g., a metal such as copper, disposed over one or more patterned underlying layers 14, which can be semiconductor, conductor or insulator layers. The patterned underlying layers can include metal features, e.g., vias, pads and interconnects. Since, prior to polishing, the bulk of conductive layer 16 is initially relatively thick and continuous, it has a low resistivity, and relatively strong eddy currents can be generated in the conductive layer.

Figure 5B:
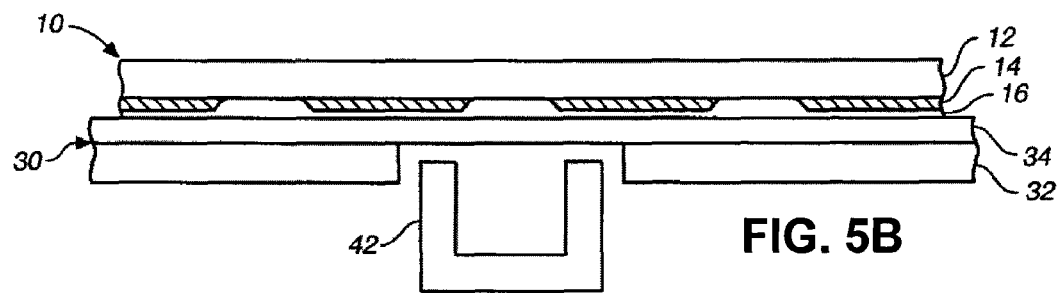

Referring to FIG. 5B, as substrate 10 is polished, the bulk portion of conductive layer 16 is thinned. As the conductive layer 16 thins, its sheet resistivity increases, and the eddy currents in the metal layer become dampened. Consequently, the coupling between metal layer 16 and sense coil 54 is reduced.

Figure 5C:
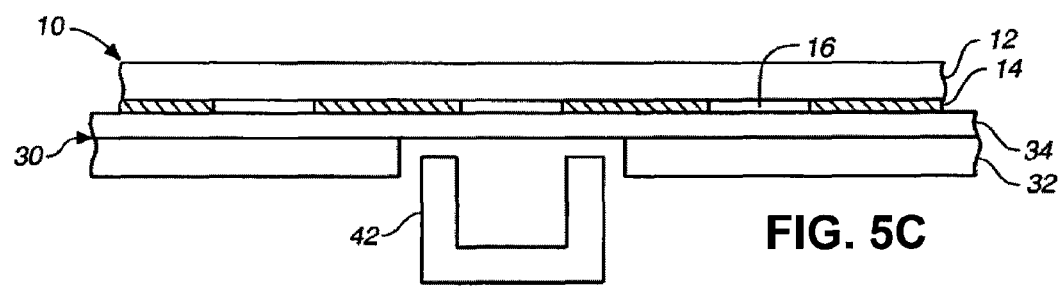

Referring to FIG. 5C, eventually the bulk portion of conductive layer 16 is removed, leaving conductive interconnects 16' in the trenches between the patterned insulative layer 14. At this points, the conductive portions in the substrate are generally small and non-continuous, and coupling between metal layer 16 and sense coil 54 reaches a minimum. This causes the output signal from the sensor circuit to level off.

By polishing one or more test substrates, the operator of the polishing machine can determine the amplitude of the output signal as a function of the thickness of the metal layer. During polishing of device substrates, the endpoint detector can halt polishing when a particular thickness of the metal layer remains on the substrate. Specifically, computer 90 can trigger the endpoint when the output signal from sensing circuitry 94 crosses a threshold value corresponding to the desired thickness. Alternatively, by sensing when the output signal has leveled off (e.g., reached a local plateau), computer 90 can sense a polishing endpoint.

The eddy current monitoring system can also be used to trigger a change in polishing parameters. For example, when the monitoring system detects a polishing criterion, the CMP apparatus can change the slurry composition (e.g., from a high-selectivity slurry to a low selectivity slurry). As another example, as discussed above, the CMP apparatus can change the pressure profile applied by the carrier head.

Figure 6:
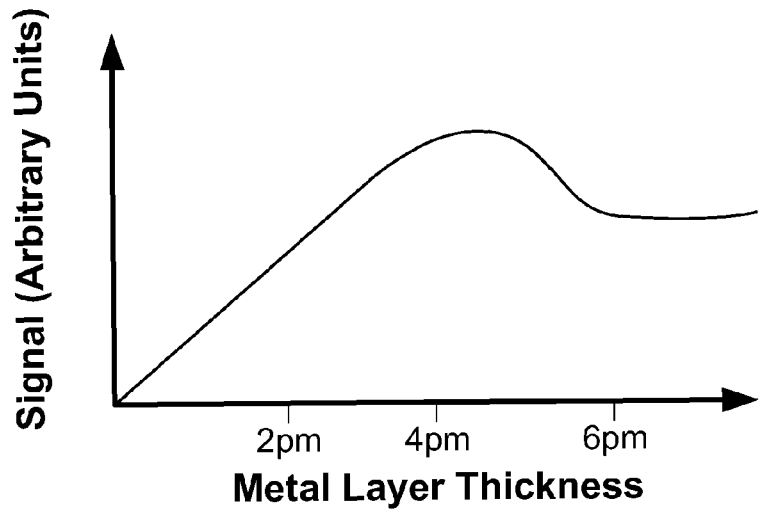
FIG. 6 is an exemplary graph illustrating a phase difference signal as a function of conductive layer thickness.

As discussed above, the phase shift measurement can be used to detect the polishing endpoint in the same fashion as the amplitude measurements discussed above. FIG. 6 illustrates a relationship between conductive layer thickness and phase difference signal. Below a first thickness, e.g., 2 to 3 microns, the phase difference is generally linearly proportional to conductive layer thickness. The phase difference reaches at maximum at a second thickness, e.g., 4 microns, somewhat above the first thickness. The phase difference decreases, then stabilizes above a third thickness, e.g., 5-6 microns. A possible advantage of the phase difference measurement is that the dependence of the phase difference on the metal layer thickness may be more linear than that of the amplitude. In addition, the absolute thickness of the metal layer can be determined over a wide range of possible thicknesses.

Figure 7:
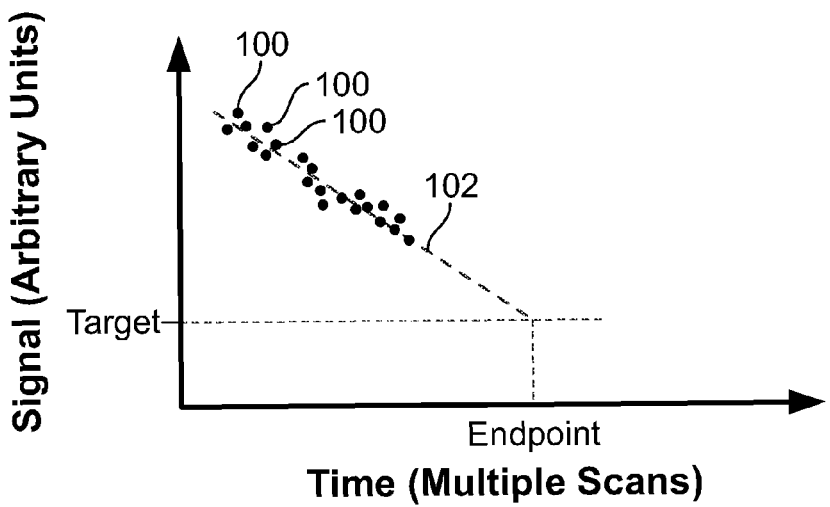
FIG. 7 is an exemplary graph illustrating a trace from the eddy current monitoring system.

An example of a trace generated by an eddy current monitoring system that measures the phase difference between the drive and sense signals is shown in FIG. 7. For example, one or more measurements 100 can be made for each scan, and as the measurements are collected over time from multiple scans, a linear function 102 (measurement value as function of time) can be fit to measurements. In some implementations, measurements within a scan or from multiple scans can be averaged or filtered, e.g., a running average can be calculated.

The eddy current monitoring system can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. The polishing pad can be a standard (e.g., polyurethane with or without fillers) rough pad, a soft pad, or a fixed-abrasive pad. Rather than tuning when the substrate is absent, the drive frequency of the oscillator can be tuned to a resonant frequency with a polished or unpolished substrate present (with or without the carrier head), or to some other reference.

Although an in-situ eddy current monitoring system, such as the monitoring system described above, can be used to detect induced eddy currents in a conductive layer in order to, for example, measure the thickness of the conductive layer, a number of factors may prevent accurate determination of the thickness of a conductive layer (or alternately, whether a desired endpoint in a process has been reached). First, differences among different sensors and their positioning within a chemical mechanical polishing apparatus may lead to different results. Second, differences in the measurements obtained by a particular sensor at different times and processing conditions—i.e., sensor drift—may lead to inaccurate results. Sensor drift may be caused by a number of factors, including changes in temperature. For example, during a chemical mechanical polishing process, significant heat may be generated as the slurry polishes the wafer. The heat may cause an increase in the temperature of various components of the eddy current measuring system and polishing system. The temperature increase may lead to a change in the measured signal.

In order to provide an accurate determination of the thickness of a conducting layer on the substrate, two things may be done. First, a particular sensor may be calibrated with other sensors, so that the results may be interpreted reliably across sensors. Second, measurements taken with a particular sensor may be adjusted to compensate for drift.

In an implementation, a calibration process allows data from different sensors to be analyzed to obtain reliable results across different sensors. As stated above, each sensor may have slightly different characteristics, due to differences in fabricating the sensor itself and differences in mounting the sensor on the chemical mechanical polishing apparatus. E.g., differences in fabrication and/or mounting the sensor may result in different distances between the sensor and a conductive layer on a wafer, thus significantly affecting the signal. Differences may be caused by mismatch of the LC properties among different sensors. The core material, wire winding, precise sensor positioning and capacitance all influence the resonant frequency and loss of the entire sensor assembly.

In some implementations, a sensor may be calibrated a single time. In other implementations, a sensor may be calibrated more than once. For example, a sensor may be calibrated when initially installed on a chemical mechanical polishing apparatus. The sensor may be calibrated at additional times, such as during periodic maintenance, or after one or more particular actions have been taken (e.g., the sensor may be calibrated after any action in which the sensor was removed from the chemical mechanical polishing apparatus).

Different implementations of eddy current sensing methods may use different aspects of signals obtained from induced eddy currents. For example, phase information, amplitude information, or both may be used. Thus, a sensor may be calibrated for amplitude-related data, phase-related data, or both.

In one implementation, an algorithm for determining a thickness of a conductive layer on a substrate and/or for determining if a desired endpoint has been reached in a semiconductor processing step includes a number of parameters that may be set and/or determined to calibrate a sensor. For example, four parameters may be used to calibrate the sensor. A "setpoint high" may be chosen, representing the desired signal reading when a bare wafer is proximate to the sensor. The value for "setpoint high" may be chosen as a typical sensor reading for a sensor proximate to a bare wafer. Alternately, "setpoint high" may correspond to a typical sensor reading when the sensor is "off wafer;" that is, when a wafer, which may or may not include a conductive layer, is in the chemical mechanical polishing system but is not proximate to the sensor.

Similarly, a "setpoint low" may be chosen, representing the desired signal reading when a wafer with a known thickness of a known conductor is present on a wafer proximate to the sensor. For example, the "setpoint low" may represent a typical reading for a sensor proximate to a wafer including a 20,000 Angstrom thick copper layer. The particular thickness chosen may be greater than the thickness typically measured by the sensor, so that in operation, data will be between the "setpoint low" and "setpoint high."

A "reference low" and "reference high" may then be measured using the sensor being calibrated. In order to measure the "reference high," a bare wafer may placed in the chemical mechanical polishing system with the sensor. Alternately, "reference high" may be measured when the sensor is off-wafer; that is, it is not proximate to a wafer, where the wafer may or may not include a conductive layer, In order to measure the "reference low," a wafer with the known thickness of the known conductor is placed in the chemical mechanical polishing system proximate to the sensor.

In some implementations, a single reading of each is made. In other implementations, more readings may be made. For example, reference high and reference low may be determined by placing a wafer with the known thickness of the known conductor in the chemical mechanical polishing system. The signal is measured one or more times when the wafer is proximate to the sensor ("on-wafer") and one or more times when the wafer is not proximate to the sensor ("off-wafer"). Reference low may be determined from the on-wafer readings (e.g., may be an average), while reference high may be determined from the off-wafer readings (e.g., may be an average).

Once the parameters have been determined and/or set, they may be entered into a configuration file for the particular sensor or stored in another manner for use with a sensing algorithm during processing. The sensing algorithm may then process the signal data during wafer processing using the calibration parameters.

For example, when the four calibration parameters outlined above are used, raw data may be adjusted using Equation (1) below, where $D_P$ represents data that has been processed using the calibration parameters, $D_R$ represents raw data obtained with the sensor, $R_L$ represents the reference low, $R_H$ represents the reference high, $S_H$ represents the setpoint high, and $S_L$ represents the setpoint low:

$$D_P = \left[(D_R - R_L) \cdot \frac{(S_H - S_L)}{(R_H - R_L)}\right] + S_L \qquad \text{Equation (1)}$$

Although four parameters are set and/or determined in the example above and entered in a configuration file, a sensing algorithm may use fewer parameters. For example, Equation (1) can be rewritten as Equation (1a) below:

$$D_P = mD_R + b \qquad \text{Equation (1a)}$$

In other words, the processed signal can be related to the raw signal by a slope, m, and an offset, b, where the slope is $$\frac{(S_H - S_L)}{(R_H - R_L)}$$

and the offset is $$S_L - R_L \frac{(S_H - S_L)}{(R_H - R_L)}.$$

The calibration process used above may be used with a drift compensation process. As stated above, as a particular sensor is used during polishing or other semiconductor process, the received signal may drift due to one or more factors. For example, as the system heats up during polishing, the size and/or position of the wafer, elements of the eddy current sensing system, and components of the chemical mechanical polishing system may change, which may cause the received signal to drift up or down. Further, the core's permeability and loss generally depend on temperature, and thus the core's magnetic properties are another source of temperature-dependent drift. In order to accurately determine a thickness of a conductive layer, or to determine whether an endpoint or other point in a semiconductor process has been reached, a method for drift compensation may be used.

As a conductive layer on the substrate is being polished, the on-wafer signal changes due to the changing thickness of the conductive layer. As the polishing progresses, material is removed from the conductive layer, and thus the resistance of the layer is increased. Thus, the on-wafer signal decreases as the polishing progresses. This decrease represents the actual change in thickness of the conductive layer.

However, the signal may change for other reasons as well. As mentioned above, as polishing progresses, the temperature of the wafer typically increases. The time-dependent increase in temperature may cause the signal to change over time. Other factors may contribute to signal drift as well.

In one implementation, in order to remove drift from an eddy current measurement, a change in a signal received when the sensor is not proximate to the conductive layer whose thickness is being measured (for example, an off-wafer signal) is used to estimate the amount of the on-wafer signal that is due to drift rather than a change in thickness of a conductive layer.

In one implementation, drift can be reduced by applying Equation (2) below to the data, where $S_P(n)$ represents the processed signal for scan number n, $S_R(n)$ represents the raw signal for scan n, R(0) represents a first reference level, such an off-wafer or other reference signal for the first scan or an average off-wafer amplitude or phase as determined during sensor calibration. R(n) represents a second reference level; for example, an off-wafer signal for scan number n:

$$S_P(n) = S_R(n) \cdot \frac{R(0)}{R(n)} \quad \text{Equation (2)}$$

There are a number of ways in which R(n) may be determined. For example, when the reference signal is based on an off-wafer measurement with the sensor, the reference may be determined by averaging the off-wafer signal prior to scanning the wafer, by averaging the off-wafer signal subsequent to scanning the wafer, by averaging the off-wafer signal from prior to and subsequent to scanning the wafer, by performing an average using a particular portion of the off-wafer signal, or by using particular values of the off-wafer signal. R(n) may include information from previous scans; for example, information based on data obtained during scans (n−1), (n−2), etc. For some implementations, R(n) may include information from subsequent scans; for example, information based on data obtained during scans (n+1), (n+2), etc. For example, when the thickness of a layer at a time prior to the endpoint of a process is of interest, information obtained subsequent to the scan performed at that time may be used to more accurately determine the thickness.

In other implementations of a process for reducing signal drift, a difference may be used rather than a ratio. In a simple example, the change in the reference signal (e.g., the off-wafer signal) is assumed to be due to drift, and that the drift in the desired signal can be approximated by the drift in the reference signal. The drift in the reference signal is then subtracted from the raw signal to yield a processed signal. For example, Formula (3) below may be used to correct for signal drift, where the variables in Formula (3) are denoted by the same symbols used in Formula (2) above:

$$S_P(n) = S_R(n) - [R(n) - R(0)] \quad \text{Equation (3)}$$

In other implementations, more complicated relationships may be used to compensate for drift. For example, signal drift may depend on the layer thickness or other parameter. That is, the ratio or difference used above may not accurately model the drift in conductive layers of different thicknesses. In such cases, one or more additional terms related to the thickness or other parameter may be used. Further, more complicated expressions utilizing both a ratio and a difference may be used to more accurately model drift. However, there may be simple cases where either a ratio such as that shown in Equation (2) or a difference as shown in Equation (3) may be used to model signal drift.

Figure 8:
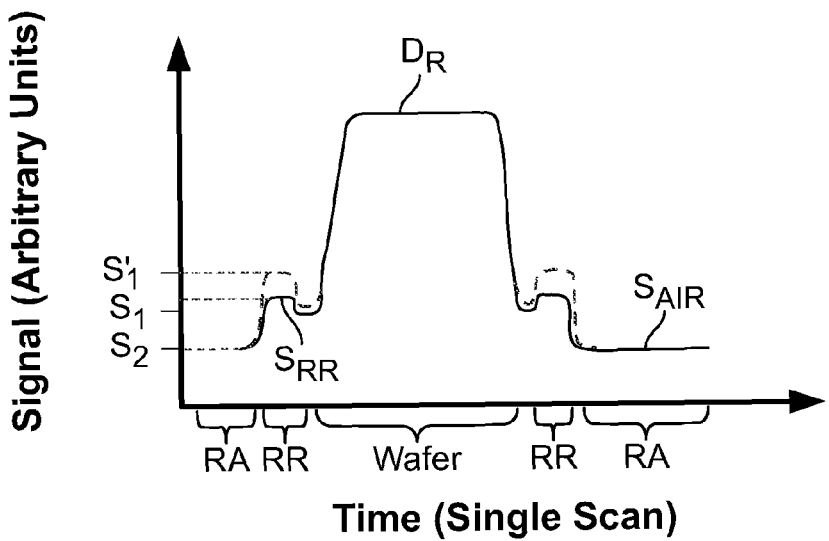
FIG. 8 is an exemplary graph illustrating a phase difference signal from a single scan across a substrate.

FIG. 8 shows a scan across a wafer including a conductive layer. In regions marked as RA in FIG. 8, the sensor is not proximate to the wafer (the sensor is "off-wafer"). In regions marked as RR on FIG. 8, the sensor is proximate to a conductive retaining ring, which raises the amplitude of the signal (relative to the off-wafer signal). In the region marked "Wafer" on FIG. 8, the sensor is proximate to the wafer (the sensor is "on-wafer"); in this region, the signal will depend on the thickness the metal layer, and might be higher or lower than the signal when the sensor is proximate to the conductive retaining ring.

In some implementations, both the offset and the gain can be adjusted automatically and repeatedly during the progress of the polishing operation. In some implementations, with each rotation of the platen, the eddy current monitoring system generates a data signal $D_R$ when the sensor is adjacent the substrate, a signal $S_{RR}$ when the sensor is adjacent the retaining ring, and a signal $S_{AIR}$ when the sensor is off-wafer and adjacent and monitoring neither the substrate nor the retaining ring. Which portion of the continuous signal from the sensor corresponds to the substrate, the retaining ring and the off-wafer zone can be determined based on the platen angular position and carrier head location, e.g., as measured by position sensor 80 and/or motor encoders, and/or by signal processing to detect the sudden change in signal strength as indicating the shift to a different portion of the signal.

A first signal value $S_1$ is generated from the signal $S_{RR}$, e.g., by selecting a measurement from a particular time (corresponding to a particular point on the retaining ring) or by averaging a section of the signal $S_{RR}$. Similarly, a second signal value $S_2$ is generated from the signal $S_{AIR}$, e.g., by selecting a measurement from a particular time (corresponding to a particular off-wafer point) or by averaging a section of the signal $S_{AIR}$. In addition, the controller stores reference low constant $K_L$ and a reference high constant $K_H$ that represent the desired low and high signal outputs, e.g., the value for the signal when no metal is present and the value for the output signal when a thick metal layer is present, respectively.

The raw data may be adjusted using Equation (5) below, where $D_P$ represents data that has been processed, and $D_R$ represents raw data obtained with the sensor:

$$D_P = \left[ (D_R - K_L) \cdot \frac{(K_H - K_L)}{(S_1 - S_2)} \right] + K_L \quad \text{Equation (5)}$$

Returning to FIG. 6, as previously discussed, above the third thickness, e.g., above 6 microns, the signal, e.g., the phase shift signal, is fairly insensitive to film thickness. Although the signal in this region is generally insensitive to film thickness, the signal does remain sensitive to the distance between the sensor coils and the metal layer, and thus sensitive to polishing pad wear. By positioning the sensor adjacent the retaining ring, signals $S_1$ and $S_2$ are generated that should be independent of metal thickness but vary with other sources of signal drift, including pad wear. In particular, if the signal $S_1$ from the retaining ring increases (as shown in phantom in FIG. 8), this can indicate that the pad is thinner and thus the retaining ring (and substrate) are closer to the coil, generating a stronger signal $S_1'$, and thus the gain is decreased.

Metal bodies other than the retaining ring can be used to generate the signal $S_{RR}$. Generally, the metal body can be formed of the same material as the layer being polished, e.g., copper, and be positioned in a location that does not overlap the substrate but that the sensor will sweep across. For example, the metal body can be part of a conditioning disk for conditioning the polishing pad, or simply be a body that rests on the polishing pad.

Figure 9:
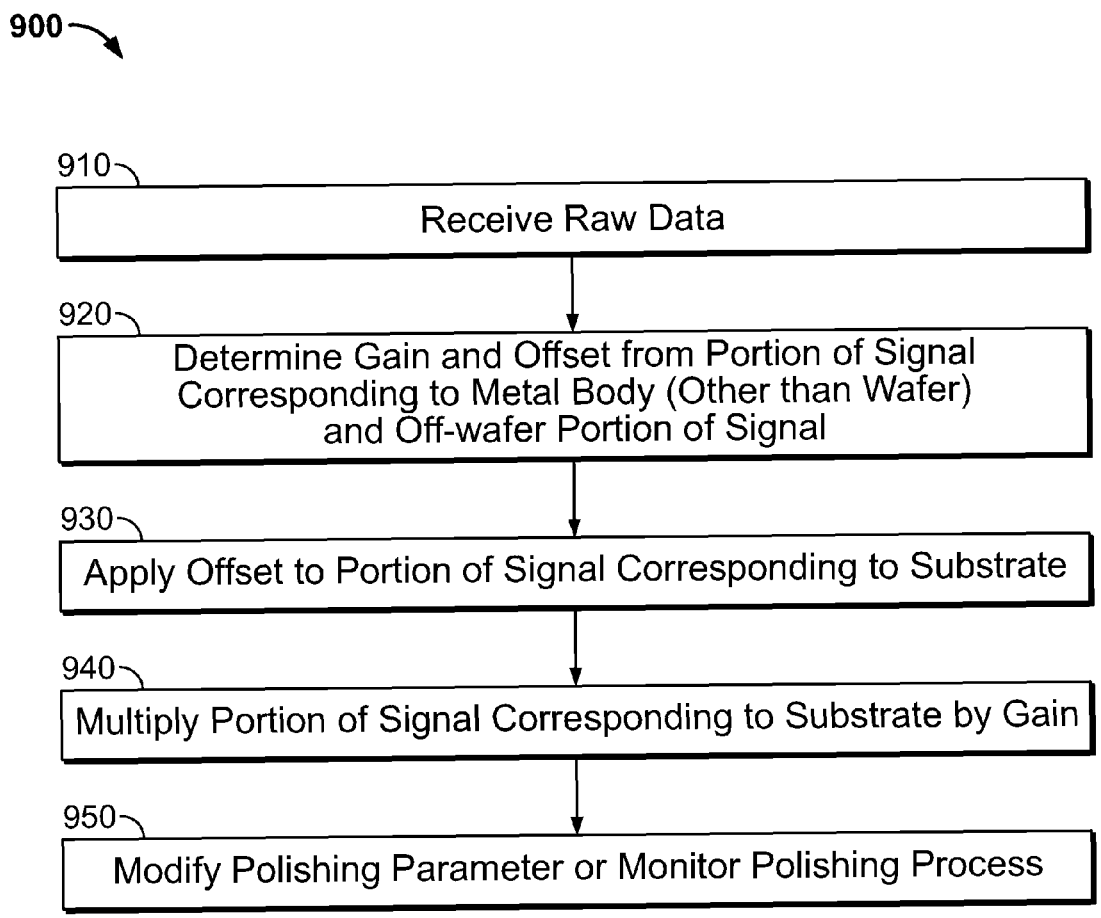
FIG. 9 is a flow diagram illustrating steps for processing eddy current data using one or more calibration parameters and one or more drift parameters.

FIG. 9 shows a process 900 that may be used to process data, e.g., phase difference data, obtained from an eddy current monitoring system. A signal with raw data is received from eddy current monitoring system (910). A gain and a signal offset are determined from the portion of the signal corresponding to the metal body (other than the wafer) and the off-wafer portion of signal (920). The offset is applied to the portion of the signal offset corresponding to the substrate (930) and the portion of the signal offset corresponding to the substrate is multiplied by the gain to produce calibrated data (940). The adjusted data can then be used to monitor and/or change the semiconductor process (950).

This process may be adapted to the different implementations such as those described above. For example, different calibration parameters may be used, and the data processed differently to obtain calibrated data. Different methods of compensating for drift may be used as well.

The functional operations described in this specification can be implemented in digital electronic circuitry, or in computer software, firmware, or hardware, or in combinations of them. Embodiments can be implemented as one or more computer program products, i.e., one or more computer programs tangibly embodied in a machine readable storage media, for execution by, or to control the operation of, data processing apparatus, e.g., a programmable processor, a computer, or multiple processors or computers.

A number of embodiments of the invention have been described. Nevertheless, it will be understood that various modifications may be made without departing from the spirit and scope of the invention. For example, more or fewer calibration parameters may be used. Additionally, calibration and/or drift compensation methods may be altered. Accordingly, other embodiments are within the scope of the following claims.

What is claimed is:

1. A method of in-situ monitoring during processing of a substrate, comprising:
    processing a conductive film on a substrate in a substrate processing apparatus;
    generating a signal from an eddy current sensor during processing, the signal including a first portion generated when the eddy current sensor is adjacent the substrate, a second portion generated when the eddy current sensor is adjacent a metal body and not adjacent the substrate, and a third portion generated when the eddy current sensor is adjacent neither the metal body nor the substrate;
    comparing the second portion of the signal to the third portion of the signal and determining a gain based at least on a result of the comparing; and
    multiplying the first portion of the signal by the gain to generate an adjusted signal.

2. The method of claim 1, further comprising making a plurality of sweeps with the eddy current sensor across the substrate and the metal body to generate a plurality of signals, each of the plurality of signals including the first portion, second portion and third portion.

3. The method of claim 2, further comprising performing the comparing and multiplying at each sweep of the plurality of sweeps to generate a plurality of adjusted signals.

4. The method of claim 1, wherein the substrate processing apparatus includes a chemical mechanical polisher that includes a polishing pad situated on a rotatable platen, the eddy current sensor situated in the platen and sweeping the substrate once per rotation of the platen.

5. The method of claim 4, wherein the metal body is on the polishing pad.

6. The method of claim 4, further comprising holding the substrate on the polishing pad with a carrier head having a retaining ring, and wherein the metal body comprises a portion of the retaining ring.

7. The method of claim 4, wherein the metal body comprises a portion of a conditioning disk for conditioning the polishing pad.

8. The method of claim 1, further comprising generating a first reference value from the second portion of the signal and generating a second reference value from the third portion of the signal.

9. The method of claim 8, further comprising storing a first constant that represents a target value for the signal from the eddy current sensor when the eddy current sensor is adjacent the metal body, and a second constant that represents a target value for the signal from the eddy current sensor when the eddy current sensor is off-wafer or when the substrate is a bare substrate.

10. The method of claim 9, wherein the gain is $$\frac{(K_1 - K_2)}{(S_1 - S_2)}$$

where $K_1$ is the first constant, $K_2$ is the second constant, $S_1$ is the first reference value, and $S_2$ is the second reference value.

11. The method of claim 1, wherein said signal is a phase difference signal.

12. A computer program product, tangibly encoded on a computer readable media, operable to cause a data processing apparatus to perform operations comprising:
    receiving a signal from an eddy current sensor during processing of a conductive film on a substrate in a substrate processing apparatus, the signal including a first portion generated when the eddy current sensor is adjacent the substrate, a second portion generated when the eddy current sensor is adjacent a metal body and not adjacent the substrate, and a third portion generated when the eddy current sensor is adjacent neither the metal body nor the substrate;
    comparing the second portion of the signal to the third portion of the signal and determine a gain based at least on a result of the comparing; and
    multiplying the first portion of the signal by the gain to generate an adjusted signal.

13. The computer program product of claim 12, wherein receiving a signal includes receiving a plurality of signals from a plurality of sweeps with the eddy current sensor across the substrate and the metal body, each of the plurality of signals including the first portion, second portion and third portion.

14. The computer program product of claim 13, operable to cause the data processing apparatus to perform operations further comprising performing the comparing and multiplying at each sweep of the plurality of sweeps to generate a plurality of adjusted signals.

15. The computer program product of claim 12, operable to cause the data processing apparatus to perform operations further comprising generating a first reference value from the second portion of the signal and generating a second reference value from the third portion of the signal.

16. The computer program product of claim 15, operable to cause the data processing apparatus to perform operations further comprising storing a first constant that represents a target value for the signal from the eddy current sensor when the eddy current sensor is adjacent the metal body and a second constant that represents a target value for the signal from the eddy current sensor when the eddy current is off-wafer or when the substrate is a bare substrate.

17. The computer program product of claim 16, wherein the gain is $$\frac{(K_1 - K_2)}{(S_1 - S_2)}$$

where $K_1$ is the first constant, $K_2$ is the second constant, $S_1$ is the first reference value, and $S_2$ is the second reference value.

* * * * *